US012460784B2

(12) United States Patent
Oh et al.

(10) Patent No.: US 12,460,784 B2
(45) Date of Patent: Nov. 4, 2025

(54) VEHICLE LAMP

(71) Applicant: SL Corporation, Daegu (KR)

(72) Inventors: Hyeok Woo Oh, Gyeongsan-si (KR); Da Il Kang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/759,834

(22) Filed: Jun. 29, 2024

(65) Prior Publication Data

US 2025/0035280 A1 Jan. 30, 2025

(30) Foreign Application Priority Data

Jul. 26, 2023 (KR) ........................ 10-2023-0097274

(51) Int. Cl.
*F21S 41/20* (2018.01)
*F21S 41/43* (2018.01)

(52) U.S. Cl.
CPC ............. *F21S 41/285* (2018.01); *F21S 41/43* (2018.01)

(58) Field of Classification Search
CPC ......... F21S 41/285; F21S 41/43; F21S 41/265
See application file for complete search history.

(56) References Cited

U.S. PATENT DOCUMENTS

| | | | | |
|---|---|---|---|---|
| 12,078,339 | B2 * | 9/2024 | Kang | F21V 5/007 |
| 12,241,609 | B2 * | 3/2025 | Jin | F21S 41/26 |
| 2018/0187851 | A1 * | 7/2018 | Hossfeld | F21S 45/48 |
| 2024/0426447 | A1 * | 12/2024 | Kazama | F21S 41/275 |

* cited by examiner

*Primary Examiner* — Matthew J. Peerce
(74) *Attorney, Agent, or Firm* — United One Law Group LLC; Kongsik Kim; Jhongwoo Peck

(57) ABSTRACT

A vehicle lamp for forms an optimal beam pattern via a plurality of lamp modules arranged in at least one direction, and each of the plurality of lamp modules includes a light source unit that generates light, a light path adjusting unit, which guides and adjusts a path of the light generated from the light source unit, and a lens unit, through which the light guided by the light path adjusting unit passes to form a beam pattern. The lens unit includes a plurality of incident lenses and a plurality of exit lenses, through which light incident on each of the plurality of incident lenses is emitted.

9 Claims, 8 Drawing Sheets

VEHICLE LAMP

CROSS-REFERENCE TO RELATED APPLICATION

This application claims priority from Korean Patent Application No. 10-2023-0097274 filed on Jul. 26, 2023, which is incorporated herein by reference in its entirety.

BACKGROUND

1. Technical Field

The present disclosure relates to a vehicle lamp, and more particularly, to a vehicle lamp capable of forming an optimal beam pattern.

2. Description of the Related Art

Generally, vehicles are equipped with various lamps intended for illumination functions for more easily identifying objects located around the vehicle in low-light conditions (e.g., nighttime driving), and for signaling functions for notifying surrounding vehicles or pedestrians of the vehicle's driving status.

For example, headlamps and fog lamps are primarily intended for illumination, and turn signal lamps, tail lamps, and brake lamps are primarily intended for signaling. Each lamp is designed to adequately fulfill its function, and its installation standards and specifications are regulated.

Particularly, the headlamps play a very important role in ensuring safe driving by projecting light in the driving direction of the vehicle to secure the driver's forward visibility.

Each beam pattern formed by the headlamps includes a hot spot area and a spread area. The hot spot area is formed to have a higher brightness compared to the spread area, securing an improved visibility distance. For sufficient visibility distance, it is required that the hot spot area be formed at the position specified by regulations to create an optimal beam pattern.

SUMMARY

Aspects of the present disclosure provide a vehicle lamp capable of forming an optimal beam pattern that secures sufficient visibility distance by forming an area with the highest brightness in the beam pattern at a predetermined position.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may form a beam pattern via a plurality of lamp modules arranged in at least one direction. Each of the plurality of lamp modules may include a light source unit that generates light, a light path adjusting unit that guides and adjusts a path of the light generated from the light source unit, and a lens unit, through which the light guided by the light path adjusting unit passes to form a beam pattern. The lens unit may include a plurality of incident lenses and a plurality of exit lenses, such that the light incident on each of the plurality of incident lenses may be emitted through the plurality of exit lenses.

The light path adjusting unit may include a first optical lens, which is disposed in front of the light source unit, and a second optical lens, which is disposed in front of the first optical lens.

The first optical lens may include an incident portion, on which the light is incident from the light source unit and which has a substantially flat shape, and an exit portion, through which the light incident on the incident portion is emitted and which has a convex shape.

The second optical lens may include an incident portion, on which the light emitted from the first optical lens is incident, and an exit portion, through which the light incident on the incident portion is emitted and which includes a plurality of exit surfaces. The incident portion may have a convex shape that protrudes rearward. The exit surfaces may each have a shape that is inclined downwardly going toward the front. Accordingly, the light emitted from the plurality of exit surfaces may proceed obliquely downward toward the front.

A center of a first exit surface among the plurality of exit surfaces may be vertically spaced apart from centers of a first incident lens among the plurality of incident lenses and a first exit lens among the plurality of exit lenses that correspond to the first exit surface. More particularly, the centers of the first incident lens and the first exit lens may be disposed below the center of the first exit surface. The centers of the first incident lens and the first exit lens may also be vertically spaced apart. In particular, the center of the first exit lens may be disposed below the center of the first incident lens.

The lens unit may further include a transmission member, which transmits light that is incident on each of the plurality of incident lenses to each of the plurality of exit lenses. The transmission member may include a plurality of shielding surfaces, with front ends thereof being disposed at or near rear focus of the respective exit lenses.

According to the vehicle lamp of the present disclosure, one or more of the following effects can be achieved.

Since light emitted from a light path adjusting unit is emitted obliquely downward toward the front, light with the highest brightness generated from the center of the light-emitting surface of at least one light source may be converged at the rear focus of an exit lens, forming the hot spot area of a beam pattern. Therefore, the hot spot area may be formed at the position specified by regulations, and sufficient visibility distance may be secured.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
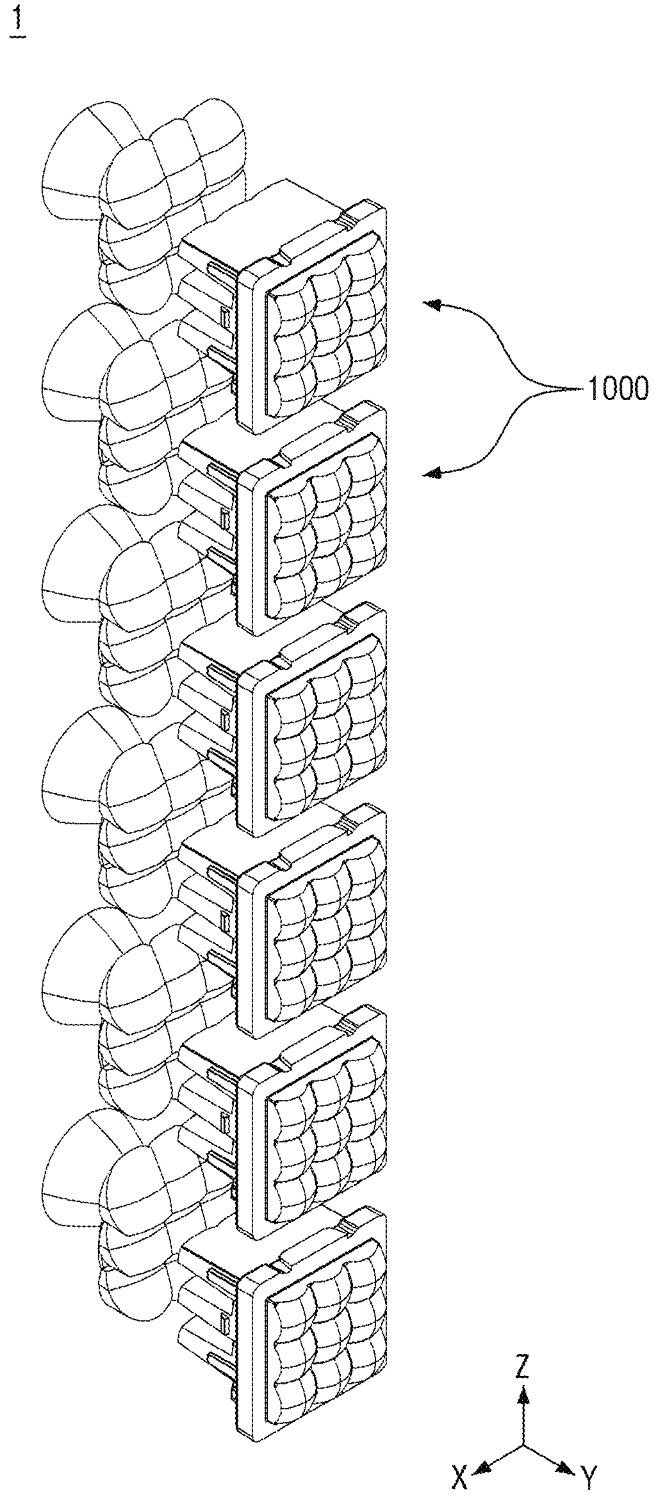
FIGS. 1 and 2 are perspective views illustrating a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like reference numerals refer to like elements throughout the specification.

Therefore, in some embodiments, well-known processes, well-known structures and well-known technologies will not be specifically described in order to avoid ambiguous interpretation of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated component, steps, operations, and/or elements, but do not preclude the presence or addition of one or more other components, steps, operations, elements, and/or groups thereof. As used herein, the term "and/or" includes any and all combinations of one or more of the associated listed items.

Embodiments of the disclosure are described herein with reference to cross-section and/or schematic illustrations that are illustrations of exemplary embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. In addition, each element illustrated in the figures of the present disclosure may have been enlarged or reduced for ease of description. Throughout the specification, like reference numerals in the drawings denote like elements.

Embodiments of the present disclosure will be described with reference to the attached drawings.

Figure 2:
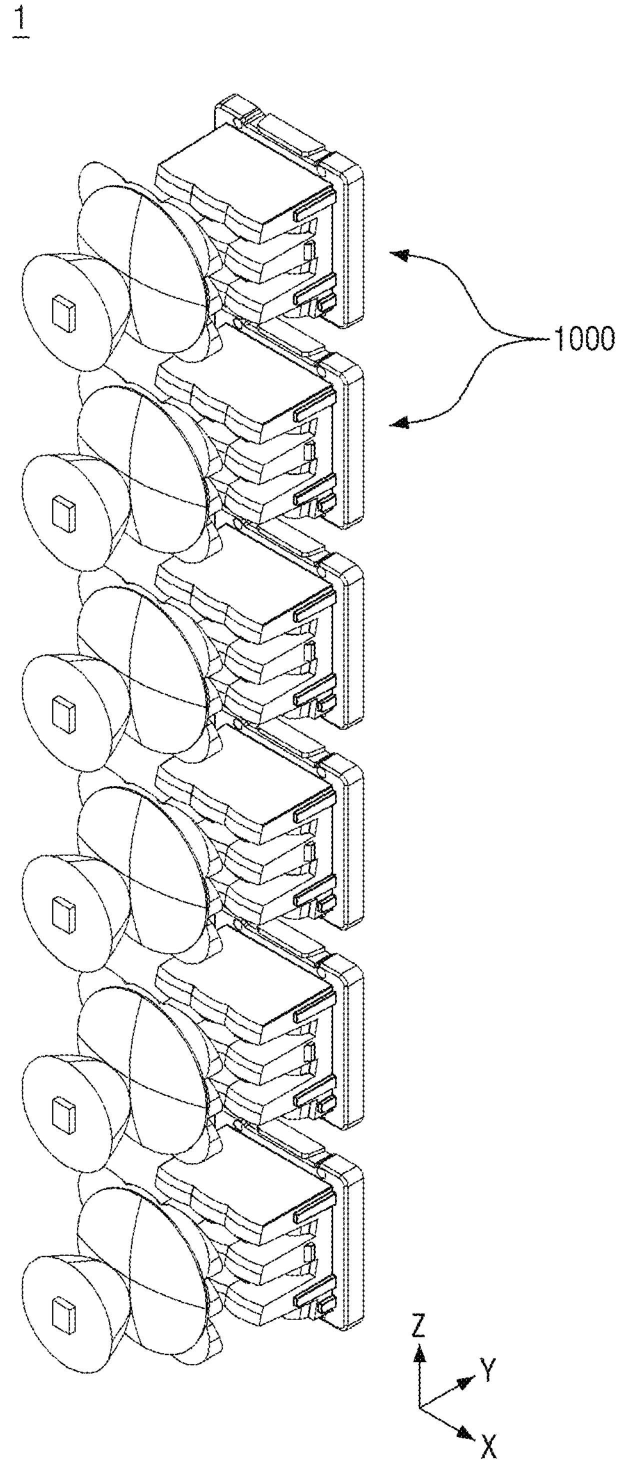

FIGS. 1 and 2 are perspective views illustrating a vehicle lamp according to an embodiment of the present disclosure. Referring to FIGS. 1 and 2, a vehicle lamp 1 may include a plurality of lamp modules 1000, which are arranged in at least one direction. The lamp modules 1000 may be arranged, for example, in a vertical direction, but the present disclosure is not limited thereto. The arrangement direction and the number of lamp modules 1000 may be varied according to the layout or design of the vehicle lamp 1.

The vehicle lamp 1 may be used as a headlamp, which irradiates light in a vehicle's driving direction to secure forward visibility for the driver when the vehicle is driven at night or through a dark place such as a tunnel, but the present disclosure is not limited thereto. That is, the vehicle lamp 1 may also be used for various other purposes such as a tail lamp, a brake lamp, a daytime running lamp, a fog lamp, a turn signal lamp, and a backup lamp installed in the vehicle.

When used as a headlamp, the vehicle lamp 1 may form at least one of two beam patterns, i.e., a low beam pattern that projects light downward relative to a cutoff line to ensure a broad front near-field view without causing glare to the drivers of oncoming vehicles or vehicles ahead, or a high beam pattern that secures a longer visibility distance for the vehicle's front far-field. When the high beam pattern is formed, the low beam pattern may also be formed to ensure both a wide field of view and a long visibility distance for the vehicle's front near-field.

In the present disclosure, the X-axis direction may represent the left-right direction (e.g., the lateral direction) or the width direction of the vehicle, the Y-axis direction may represent a front-rear direction (e.g., the longitudinal direction) or the direction of the vehicle's travel, and the Z-axis direction may represent the top-bottom direction (e.g., the vertical direction) or the height direction of the vehicle.

In the case of forming a low beam pattern via the lamp modules 1000, the low beam pattern may be formed by overlapping sub-beam patterns that are formed by the respective lamp modules 1000 having substantially identical light distribution characteristics, or by synthesizing sub-beam patterns that are formed by the respective lamp modules 1000 having different light distribution characteristics. The light distribution characteristics may include the position, brightness, shape, and size of an area where light is projected. Here, the formation of sub-beam patterns with different light distribution characteristics formed may be understood as forming sub-beam patterns that differ in at least one of the position, brightness, shape, or size of the area where light is projected.

Figure 3:
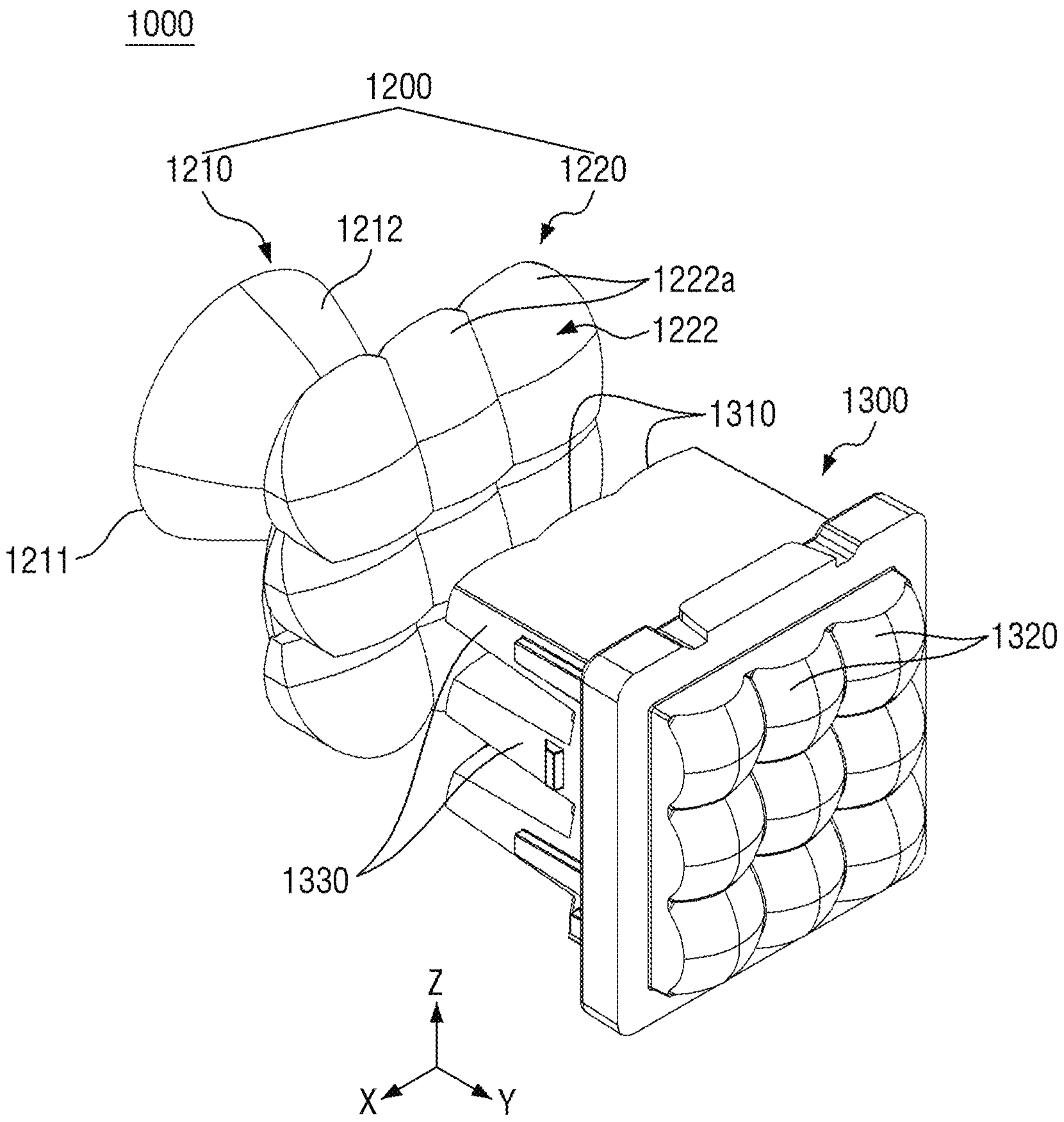
FIGS. 3 and 4 are perspective views illustrating a lamp module according to an embodiment of the present disclosure.
Figure 4:
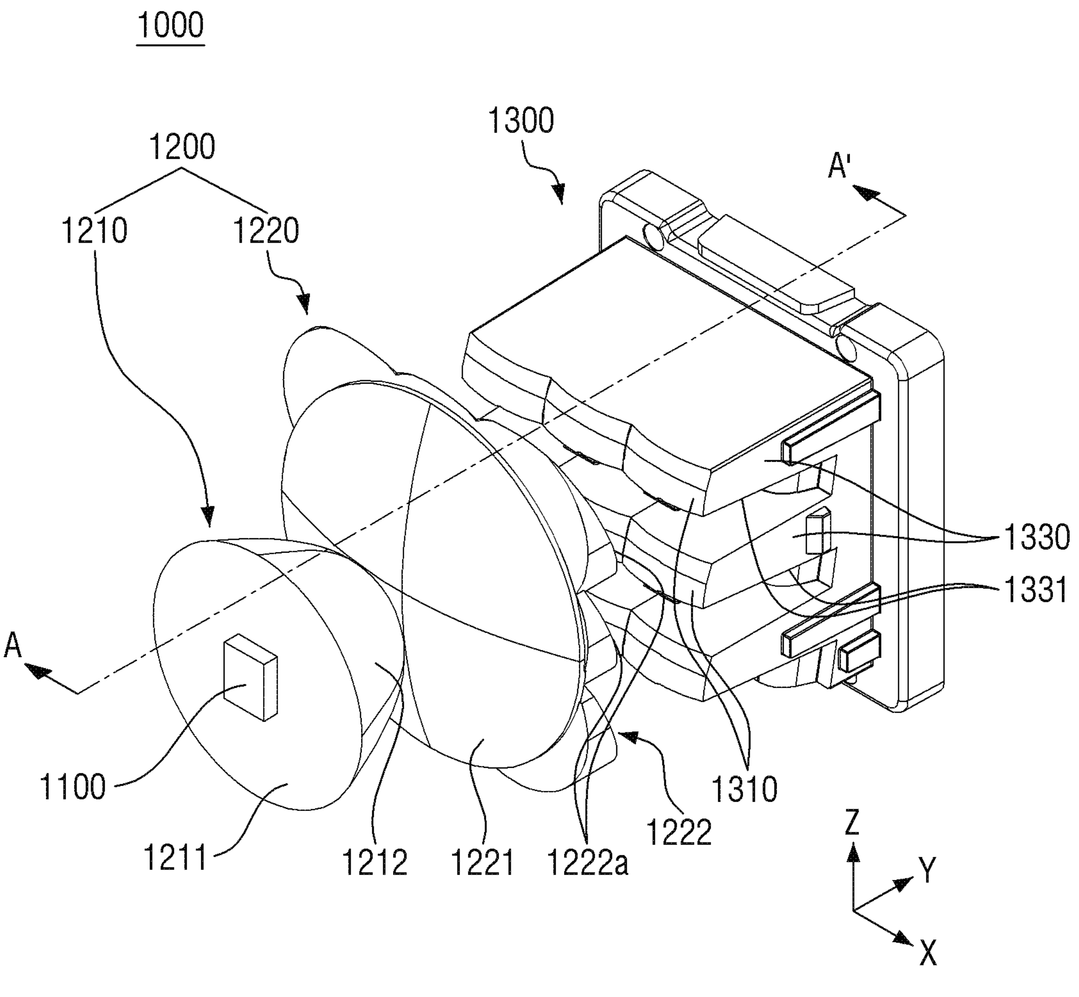
Figure 5:
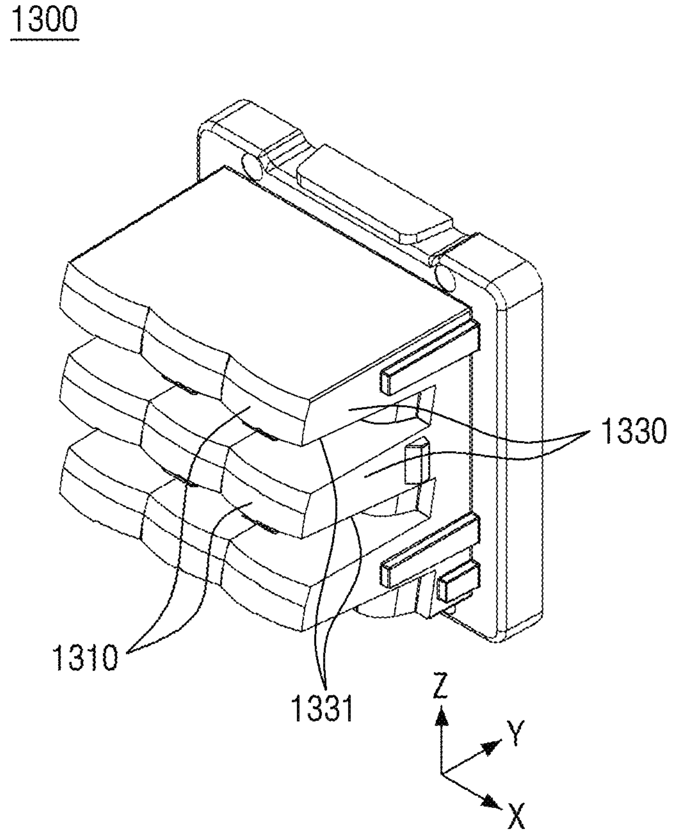
FIG. 5 is a perspective view illustrating a lens unit according to an embodiment of the present disclosure.
Figure 6:
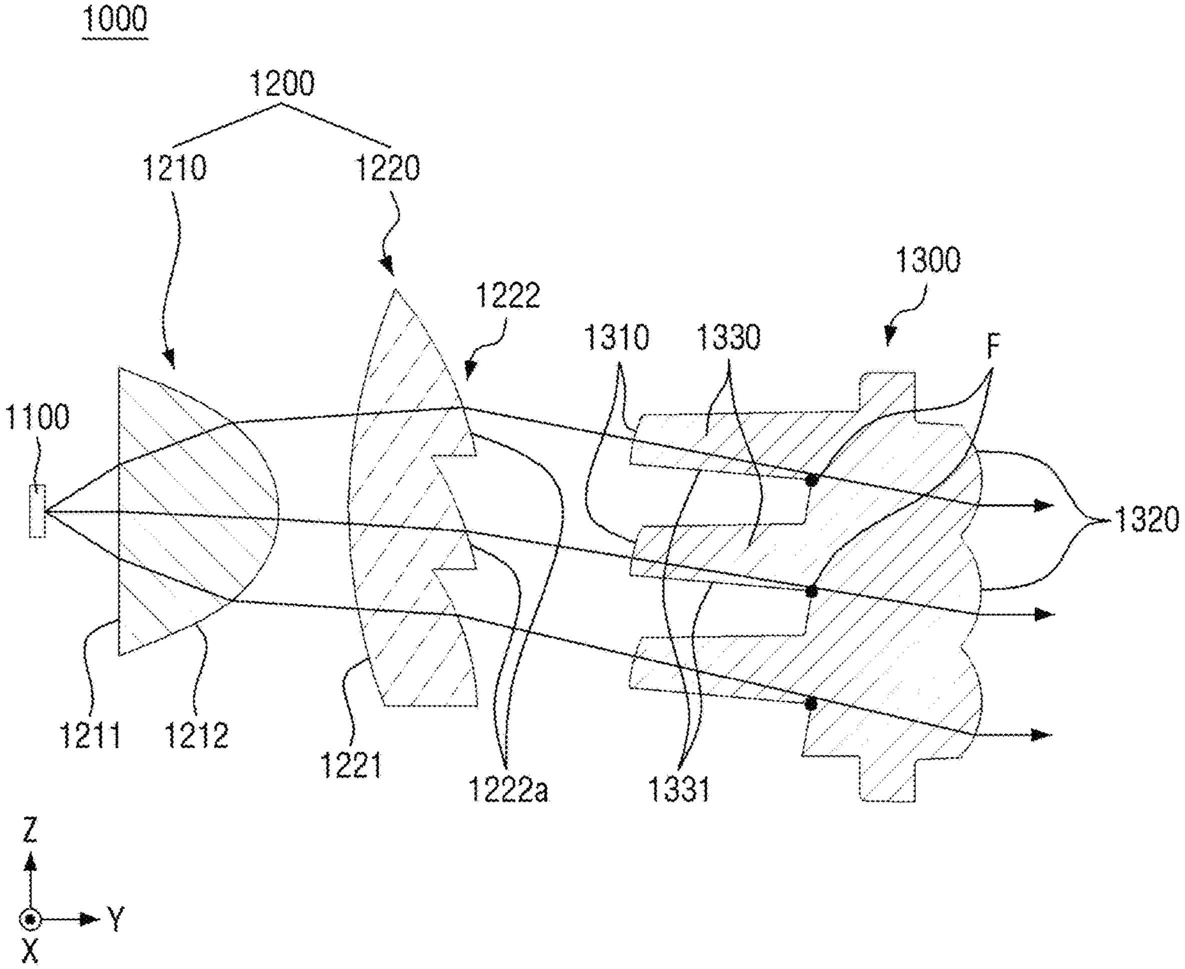
FIG. 6 is a cross-sectional view taken along line A-A' of FIG. 4.

FIGS. 3 and 4 are perspective views illustrating a lamp module according to an embodiment of the present disclosure, FIG. 5 is a perspective view illustrating a lens unit according to an embodiment of the present disclosure, and FIG. 6 is a cross-sectional view taken along line A-A' of FIG. 4. FIGS. 3 through 6 illustrate one of the lamp modules 1000 of FIGS. 1 and 2, and the following descriptions may be applicable to the other lamp modules 1000.

Referring to FIGS. 3 through 6, a lamp module 1000 may include a light source unit 1100, a light path adjusting unit 1200, and a lens unit 1300.

The light source unit 1100 may include at least one light source capable of generating light with an appropriate intensity and/or color for the intended use of the vehicle lamp 1. A semiconductor light-emitting element such as a light-emitting diode (LED) may be used as the at least one light source, but the present disclosure is not limited thereto. The at least one light source may include various other light sources such as a laser diode (LD) or a bulb, and optical elements such as a reflector, a mirror, or a phosphor may be additionally used depending on the type of the at least one light source.

The light path adjusting unit 1200 may be disposed in front of the light source unit 1100 and adjust the path of light that is incident from the light source unit 1100 so that the light may proceed along an appropriate path.

The light path adjusting unit 1200 may be disposed, for example, in front of the light source unit 1100, assuming that the light is emitted forward from the vehicle lamp 1, but depending on the position or direction in which the vehicle lamp 1 is installed, the description of the location of the light path adjusting unit 1200 may vary.

The light path adjusting unit 1200 may include a first optical lens 1210, which is disposed in front of the light source unit 1100, and a second optical lens 1220, which is disposed in front of the first optical lens 1210. However, the present disclosure is not limited thereto. Alternatively, if the path of light to be formed by both the first and second optical lenses 1210 and 1220 can be achieved by a single optical lens, the light path adjusting unit 1200 may include only one optical lens. Alternatively, the light path adjusting unit 1200 may include three or more optical lenses.

An incident portion 1211 of the first optical lens 1210 may have a substantially flat shape, and an exit portion 1212 of the first optical lens 1210 may have a convex shape. The first optical lens 1210 may concentrate the light generated from the light source unit 1100.

An incident portion 1221 of the second optical lens 1220 may have a convex shape to concentrate the light emitted from the first optical lens 1210, and an exit portion 1222 of the second optical lens 1220 may include a plurality of exit surfaces 1222*a*. The exit surfaces 1222*a* may be formed as planes, curved surfaces, or a combination thereof that are generally inclined downwardly toward the front, allowing the light incident on the incident portion 1221 to be emitted obliquely downwardly as it proceeds forward.

The light generated from the light source unit 1100 may be concentrated primarily by the first optical lens 1210, and may be adjusted to be concentrated and emitted forward while being tilted obliquely downward by the second optical lens 1220, but the present disclosure is not limited thereto. Alternatively, if the concentration and path adjustment of light can be achieved by adjusting the curvature of one of the first lens 1210 or the second optical lens 1220, the other lens may be omitted.

Light may be adjusted by the second optical lens 1220 to be emitted obliquely downwardly toward the front to secure a sufficient visibility distance, particularly, to form an area with the highest brightness, i.e., a hot spot area, at a position specified by regulations near the center of the cutoff line, and this feature will be described later in further detail.

The lens unit 1300 may include a plurality of incident lenses 1310 into which the light guided by the light path adjusting unit 1200 is incident, a plurality of exit lenses 1320 from which the light incident into the respective incident lenses 1310 is emitted, and a transmission member 1330, which directs at least some of the light incident into the incident lenses 1310 to the exit lenses 1320.

In this case, the transmission member 1330 may include a plurality of shielding surfaces 1331 with their front ends disposed at rear focus F of the respective exit lenses 1320, and the rear ends of the shielding surfaces 1331 may be connected to the bottom ends of the respective incident lenses 1310.

The front ends of the shielding surfaces 1331 may be disposed at the rear focus F of the respective exit lenses 1320 to prevent the light incident into the incident lenses 1310 from being transmitted through the corresponding exit lenses 1320 below the rear focus F thereof, thereby preventing the light from being projected above the cutoff line.

In other words, if the light incident into the incident lenses 1310 is transmitted and emitted through the corresponding exit lenses 1320 below the rear focus F of the corresponding exit lenses 1320, it may be refracted and emitted relatively upwardly, causing light to be projected above the cutoff line, which may result in causing glare for the drivers of oncoming vehicles. Therefore, to prevent the glare, the front ends of the shielding surfaces 1331 may be disposed at the rear focus F of the respective exit lenses 1320.

Herein, the rear focus F of the exit lenses 1320 may have a shape such as a point, line, surface, space, or a combination thereof, depending on the area where light is substantially focused.

As mentioned above, the light emitted from the light path adjusting unit 1200 may be emitted obliquely downward toward the front, the light emitted obliquely downward from the light path adjusting unit 1200 may be incident on the incident lenses 1310, and the light incident on the incident lenses 1310 may be emitted through the respective exit lenses 1320. To facilitate this, the centers of the exit surfaces 1222*a*, incident lenses 1310, and exit lenses 1320 that correspond to one another may be spaced apart in the vertical direction.

Figure 7:
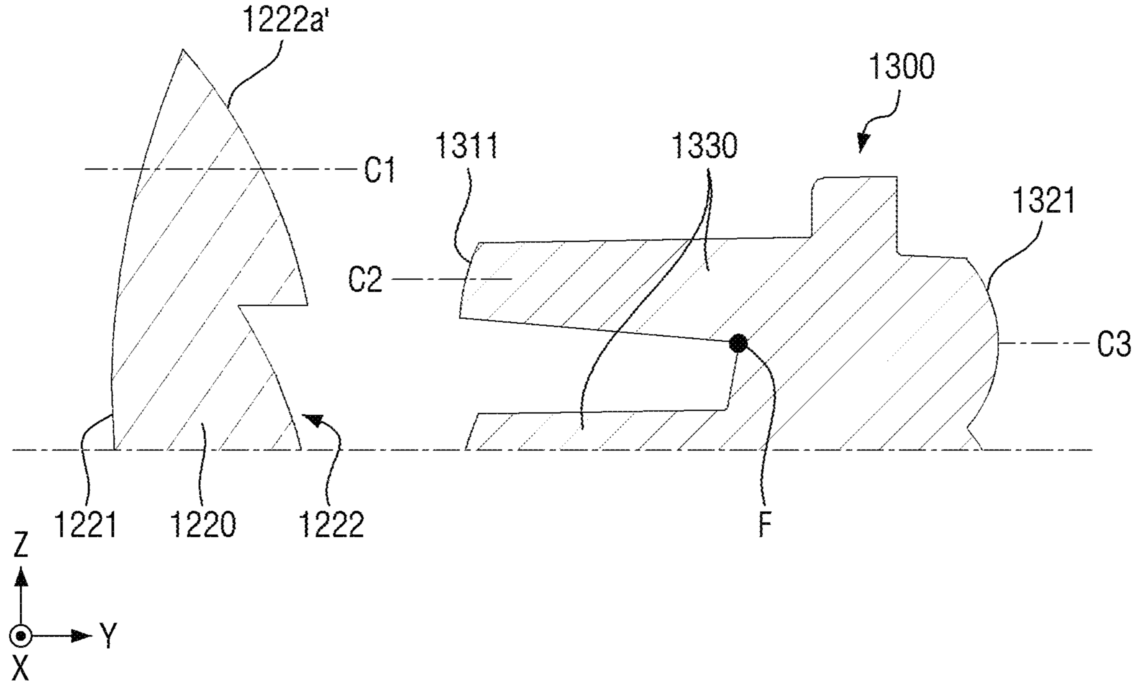
FIG. 7 is a schematic view illustrating the central positions of an emission surface, an incident lens, and an emission lens according to an embodiment of the present disclosure that correspond to one another.

For example, referring to FIG. 7, provided that the exit surfaces 1222*a*, the incident lenses 1310, and the exit lenses 1320 include a first exit surface 1222*a*', a first incident lens 1311, and a first exit lens 1321, respectively, which correspond to one another, a center C1 of the first exit surface 1222*a*' may be disposed higher than a center C2 of the first incident lens 1311, and a center C3 of the first exit lens 1321 may be disposed lower than the center C2 of the first incident lens 1311.

In FIG. 7, the centers C1, C2, and C3 of the first exit surface 1222*a*', the first incident lens 1311, and the first exit lens 1321, respectively, may be understood as being the centers, in the vertical direction, of the first exit surface 1222*a*', the first incident lens 1311, and the first exit lens 1321, respectively.

Thus, the centers of each set of an exit surface 1222*a*, an incident lens 1310, and an exit lens 1320 that correspond to one another may be spaced apart in the vertical direction to enable the light with the highest brightness generated from the center of at least one light-emitting surface to be focused at or near the rear focus F of the corresponding exit lens 1320, thereby ensuring that the position specified by regulations around the center of the cutoff line has the highest brightness.

In other words, as at least one light source has a substantially uniform-size light-emitting surface, the propagation surface where light generated from the at least one light source propagates has a size corresponding to the light-emitting surface. In this case, light with the highest brightness generated from the center of the light-emitting surface passes through the center of the propagation surface. Therefore, to ensure that the light that passes through the center of the propagation surface is focused on the rear focus F of the exit lens 1321, the light emitted from the light path adjusting unit 1200 may be emitted obliquely downward toward the front. This configuration provides that the central axes of the corresponding exit surface 1222*a*', incident lens 1311, and exit lens 1321 are spaced apart in the vertical direction.

Figure 8:
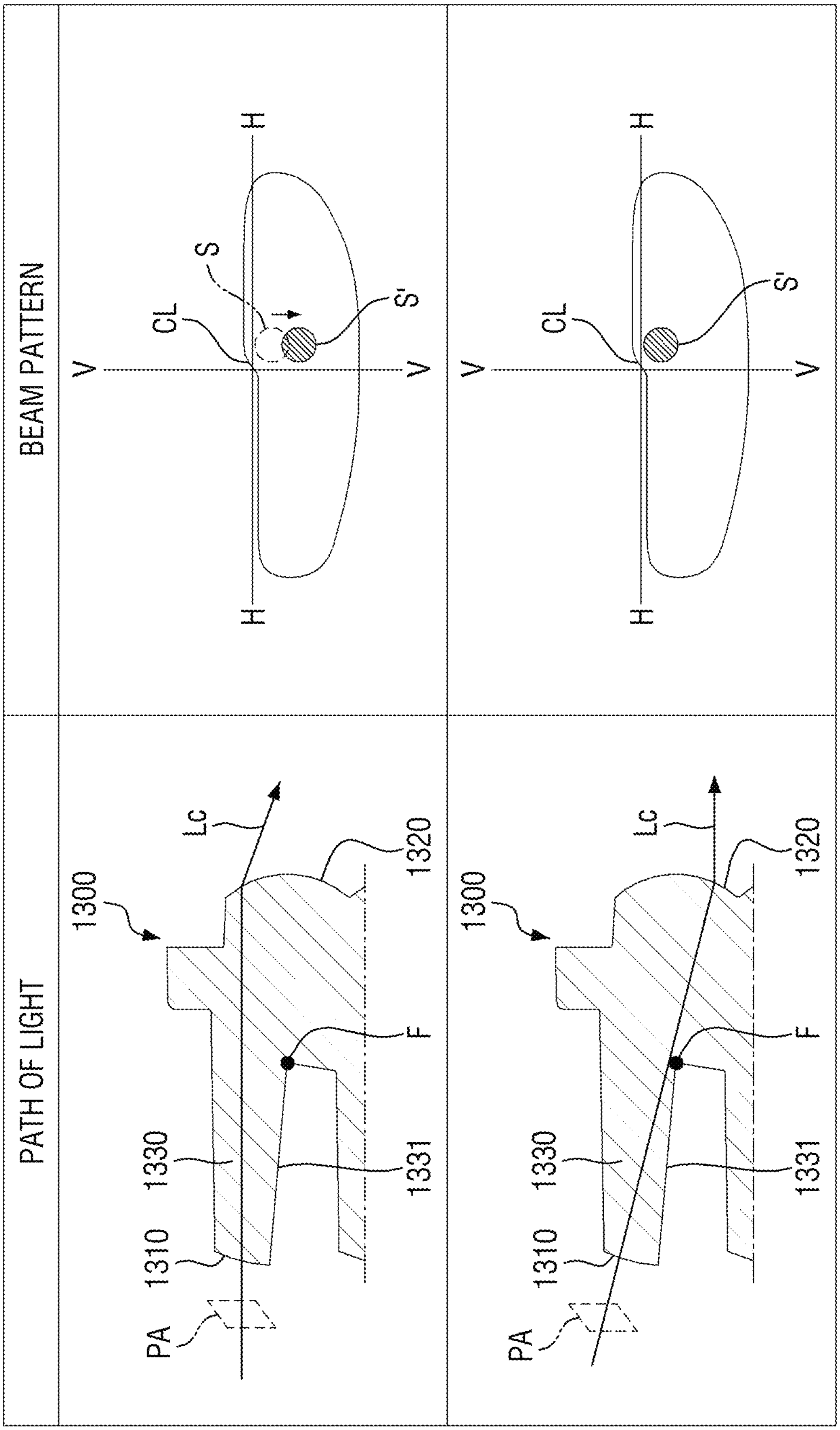
FIG. 8 is a schematic view illustrating the light distribution characteristics of beam patterns formed depending on the direction in which light is incident on the incident lens according to an embodiment of the present disclosure.

In other words, as illustrated in FIG. 8, if light is emitted horizontally from the light path adjusting unit 1200, light Lc that has the highest brightness and passes through the center of a propagation surface PA corresponding to a light-emitting surface also proceeds horizontally. In this case, the light Lc is transmitted through an exit lens 1320 above the rear focus F, causing it to be refracted and emitted downwardly. As a result, an area S' that is disposed below a regulation-designated area S near the lower center of a cutoff line CL can have the highest brightness, making it difficult to secure a sufficient visibility distance. Conversely, in an embodiment of the present disclosure, since the light is emitted obliquely downwardly toward the front from the light path adjusting unit 1200, the light Lc that has the highest brightness and passes through the center of the propagation surface PA corresponding to the light-emitting surface, may be focused at or near the rear focus F of the exit lens 1320. This configuration allows a regulation-designated area S to have the highest brightness, ensuring a sufficient visibility distance.

As described above, in the vehicle lamp 1, light is emitted obliquely downwardly toward the front from the light path adjusting unit 1200, and the central axes of the corresponding exit surfaces 1222*a*, incident lenses 1310, and exit lenses 1320 may be spaced apart in the vertical direction. This configuration ensures that the light with the highest brightness generated around the center of at least one light-emitting surface is projected onto a hotspot area as promulgated by regulations, thereby securing a sufficient visibility distance.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A vehicle lamp for forming a beam pattern via a plurality of lamp modules arranged in at least one direction, wherein each of the plurality of lamp modules includes:

a light source unit that generates light;

a light path adjusting unit that guides and adjusts a path of the light generated from the light source unit; and a lens unit, through which the light guided by the light path adjusting unit passes to form the beam pattern, wherein the lens unit includes:

a plurality of incident lenses; and a plurality of exit lenses, through which light incident on each of the plurality of incident lenses is emitted, wherein the light path adjusting unit includes a first optical lens, which is disposed in front of the light source unit, and a second optical lens, which is disposed in front of the first optical lens, wherein the second optical lens includes:

an incident portion, on which the light emitted from the first optical lens is incident; and an exit portion, through which the light incident on the incident portion is emitted and which includes a plurality of exit surfaces, and wherein a center of a first exit surface among the plurality of exit surfaces is vertically spaced apart from centers of a first incident lens among the plurality of incident lenses and a first exit lens among the plurality of exit lenses that correspond to the first exit surface.

2. The vehicle lamp of claim 1, wherein the first optical lens includes:

an incident portion, on which the light is incident from the light source unit and which has a substantially flat shape; and an exit portion, through which the light incident on the incident portion is emitted and which has a convex shape.

3. The vehicle lamp of claim 1, wherein the incident portion has a convex shape that protrudes rearward.

4. The vehicle lamp of claim 1, wherein each of the plurality of exit surfaces has a shape that is inclined downwardly toward front.

5. The vehicle lamp of claim 1, wherein the light emitted from the plurality of exit surfaces proceeds obliquely downward toward front.

6. The vehicle lamp of claim 1, wherein the centers of the first incident lens and the first exit lens are disposed below the center of the first exit surface.

7. The vehicle lamp of claim 1, wherein the centers of the first incident lens and the first exit lens are vertically spaced apart.

8. The vehicle lamp of claim 7, wherein the center of the first exit lens is disposed below the center of the first incident lens.

9. The vehicle lamp of claim 1, wherein the lens unit further includes a transmission member, which transmits light incident on each of the plurality of incident lenses to the plurality of exit lenses, and wherein the transmission member includes a plurality of shielding surfaces, with front ends thereof disposed at or near rear focus of the respective exit lenses.

* * * * *